(12) United States Patent
Smith et al.

(10) Patent No.: US 7,792,258 B1
(45) Date of Patent: Sep. 7, 2010

(54) CUSTOMER MENU

(75) Inventors: Carline Smith, Roanoke, TX (US); Gretchen Liles, Euless, TX (US); Susan Lawrence, Grapevine, TX (US)

(73) Assignee: American Airlines, Inc., Fort Worth, TX (US)

( * ) Notice: Subject to any disclaimer, the term of this patent is extended or adjusted under 35 U.S.C. 154(b) by 1096 days.

(21) Appl. No.: 11/085,885

(22) Filed: Mar. 22, 2005

(51) Int. Cl.
*H04M 1/64* (2006.01)
*H04M 15/00* (2006.01)
*H04M 15/06* (2006.01)
*H04M 3/42* (2006.01)

(52) U.S. Cl. .............. 379/142.15; 379/88.22; 379/127.01; 379/201.01; 379/201.02; 379/201.03; 379/201.04; 379/201.05

(58) Field of Classification Search .............. 379/88.22, 379/127.01, 142.15, 201.01–201.05
See application file for complete search history.

(56) References Cited

U.S. PATENT DOCUMENTS

| | | | | |
|---|---|---|---|---|
| 5,694,459 | A * | 12/1997 | Backaus et al. | 379/127.01 |
| 6,061,433 | A * | 5/2000 | Polcyn et al. | 379/93.12 |
| 6,438,215 | B1 * | 8/2002 | Skladman et al. | 379/67.1 |
| 6,487,277 | B2 * | 11/2002 | Beyda et al. | 379/88.01 |
| 7,065,201 | B2 * | 6/2006 | Bushey et al. | 379/265.01 |
| 7,146,002 | B1 | 12/2006 | Smith et al. | |
| 7,260,537 | B2 * | 8/2007 | Creamer et al. | 704/270.1 |
| 7,428,302 | B2 * | 9/2008 | Zirngibl et al. | 379/88.12 |
| 7,474,740 | B1 | 1/2009 | Smith et al. | |
| 2002/0095576 | A1 | 7/2002 | Stoltz et al. | |
| 2003/0115272 | A1 | 6/2003 | Muttitt et al. | |

OTHER PUBLICATIONS

Moosemiller, John P., "AT&T's Conversant I Voice System," Speech Technology, Mar./Apr. 1986, pp. 88-93, USA.

* cited by examiner

*Primary Examiner*—Curtis Kuntz
*Assistant Examiner*—Mohammad K Islam
(74) *Attorney, Agent, or Firm*—Haynes and Boone, LLP (57) ABSTRACT

Methods of processing a call initiated by a caller and received by a call processing system wherein, in at least one embodiment, information specific to the caller's identity is obtained, at least one message is selected automatically and based on the obtained information, and the at least one message is automatically presented to the caller, among other aspects. The obtained information upon which the at least one message is automatically selected may also be automatically obtained. Such automatically obtained information may also be obtained based on or employ previously obtained information, including previously obtained information that was also automatically obtained.

13 Claims, 6 Drawing Sheets

CUSTOMER MENU

BACKGROUND

Many merchants have telephone or "call processing" systems and other systems by which potential and existing customers may make purchases, access and modify existing order information, obtain product information, etc. Thus, quickly and accurately handling telephone calls or other means for conducting customer service transactions is critical for merchants to maintain high levels of customer satisfaction.

These call processing systems are well-known in the art. Specifically, in a traditional switched-telephone network, common telecommunications vendors provide call-processing systems incorporating interactive voice response systems and automatic-call distributors. For example, the AT&T Conversant system (as defined in Moosemiller, John P. AT&T's CONVERSANT 1 Voice System, Speech Technology, March/April 1986) is a typical automated call-processing system capable of managing a series of voice channels accessed though a common switched network. The Conversant system's architecture utilizes user-inputted signals for distributing simultaneous calls and providing a series of unique applications to the callers accessing the system. Thus, a user dialing a specific telephone number is provided automated spoken voice prompts to assist the user negotiate through the system to obtain automated information regarding a specific service, product or the like.

For example, these common call processing systems may be utilized by travel-related businesses for common reservation services. Specifically, a travel-related business may use a call-processing system to provide customer service operations such as travel itinerary verification or to make travel reservations. Other industries such as cable and telephone companies use call processing systems for outbound promotional sales and inbound repair and other related services. Brokerage houses, banks, and other financial institutions often market services to customers via common call processing systems. Telemarketers also utilize call processing systems to limit costs associated with human operators and determine a consumer's potential interest in products and services often offered in the form of games or lotteries designed to pique a consumer's interest in the item offered.

Most of these prior art systems require a user to activate or interact with the system by entering information via a common dual tone multi-frequency (DTMF) ordinary telephone. However, as signal recognition technologically is developing, many call-processing systems are adopting voice synthesis devices for interacting with the system.

Many of the afore-mentioned call processing systems have multiple numbers from which a caller must select before even dialing, because each telephone number or group of numbers may correspond to one or more certain types of transactions for which callers may access the call processing system. For example, some call processing systems can have hundreds of phone numbers from which a potential or existing customer or other caller must select the appropriate number corresponding to the desired transaction type. The vast array of telephone numbers is troublesome, as it requires some knowledge of the call processing system in order to correctly select the appropriate telephone number. Consequently, potential and existing customers interacting with these prior art call processing systems frequently dial a telephone number that does not correspond to their desired transaction, resulting in the caller being re-routed or transferred to another phone number, menu, or application, because the application they initially accessed does not handle their desired transaction type. This improper routing results in additional telecommunications fees to the entity offering the call-processing system as well as frustrated customers. The frustrated customers often "opt-out" of the call-processing automated operation and request the assistance of a human operator thus eliminating the financial benefits achieved by employing an automated call-processing system.

In addition to this drawback of traditional call processing systems, previous call-processing systems fail to provide an opportunity to consumers to tailor the consumer's interaction with the system. Most call processing systems deliver prompts to callers during the course of determining the desired transaction and performing the transaction. For example, the caller may be prompted to press a certain key on their telephone key pad if they are seeking to conduct a first transaction type, or to press another key if they are seeking to conduct a second transaction type, and so on. In addition, many call processing systems require callers to traverse many such options before arriving at the desired transaction application and ultimately completing the transaction. Thus, in addition to errors resulting from incorrectly selecting the telephone number to dial prior to accessing the call processing system, many errors are also attributable to incorrectly responding to prompts regarding the caller's intended transaction.

Furthermore, each of the menus or applications traversed by a caller during a particular call must be traversed by every caller. That is, every caller accesses standard, identical menus and/or applications. Thus, even callers that are familiar with the call processing system must spend the time necessary to traverse the appropriate menus to arrive at the desired location in the call processing system. This can be very frustrating to the caller.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
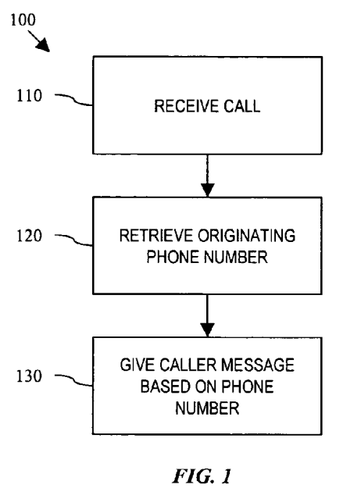
FIG. 1 is a flow-chart diagram of at least a portion of one embodiment of a method according to aspects of the present disclosure.

Referring to FIG. 1, illustrated is a flow-chart diagram of at least a portion of one embodiment of a method 100 according to aspects of the present disclosure. The method 100 may be or comprise a method of processing a phone call according to aspects of the present disclosure. The method 100 includes receiving a phone call in a step 110. The phone call may originate from a phone number (or device corresponding thereto) of an existing or potential customer or another person desiring to use the call processing system by which the method 100 is implemented. The caller's phone number may correspond to a wired or "land-line" phone, such as a residential phone networked or otherwise connected to a telecommunications network, including to and/or through one or more public switched telephone networks. The caller's phone number may also or alternatively correspond to a wireless or cellular phone, such as a mobile phone networked or otherwise in communication with a wireless or cellular telecommunications network.

The method 100 also includes recognizing the caller by retrieving the phone number from which the caller is calling in a step 120. Many modes for recognizing a caller may be employed. For example, as in this embodiment, the caller's phone number may be obtained automatically via an automatic number identification (ANI) service or other like service, such as that which may provide the receiver of a telephone call with the number of the calling phone. The caller's phone number may also be retrieved by requesting the caller provide the phone number from which they are calling, such as by a spoken or keyed response. In one embodiment, the phone number is requested from the caller in addition to being automatically retrieved, such as to verify that the automatically retrieved number is correct, and/or to request the caller's permission to use the automatically retrieved number. However, such request for the caller's permission to use the automatically retrieved number may not require that the caller provide the phone number. For example, the caller may indicate their permission or lack thereof by a spoken or keyed response not necessarily including their phone number. Step 120, or another step in the method 100, may also comprise asking the caller's permission to store their phone number for use during subsequent processing, including during subsequent calls. The caller's phone number may comprise any number of numeric and/or alphanumeric digits. For example, the caller's phone number may comprise ten numeric digits ranging between zero and nine, inclusively (e.g., 123-555-7890).

The method 100 also includes a step 130 in which one or more messages are automatically selected for delivery to the caller based on the phone number retrieved in step 120. Thus, the one or more messages automatically selected for delivery to the caller in step 130 may be based on the caller's identity, because many residential and cellular phone numbers have a one-to-one correspondence with the users of such phone numbers.

The one or more messages automatically selected for delivery to the caller in step 130 are myriad. For example, if the phone number from which the caller is calling is a New York City-based residential or cellular phone number and, at the time of the call, there are inclement weather conditions in New York, a message selected for delivery to the caller may indicate airline flight delays attributable to the inclement weather conditions, possibly including delay amounts (e.g., 45 minutes, etc.) and/or flight redirection information. In another example, a message selected for delivery to the caller may be based on the automatic selection of a travel departure city based on the caller's phone number, customer ID, and/or another type of proactive information that may be retrieved by employing the caller's phone number. For example, the message, "Hello, Mr. Smith. Would you like to reserve a flight departing from Boston?" may be delivered to the caller (Mr. Smith), and the departure city (Boston) may be automatically selected based on the phone number from which Mr. Smith is calling. Other examples for the one or more messages which may be delivered to the caller based on the caller's phone number are described below.

Figure 2:
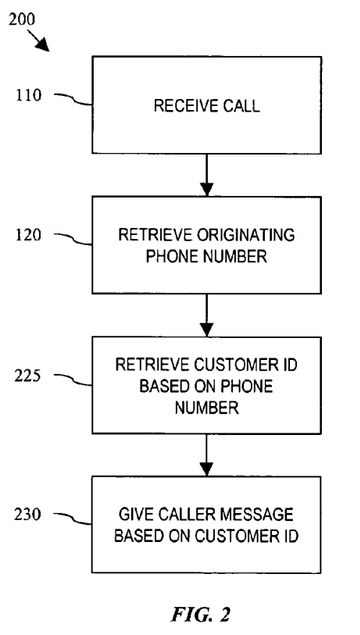
FIG. 2 is a flow-chart diagram of at least a portion of another embodiment of a method according to aspects of the present disclosure.

Referring to FIG. 2, illustrated is a flow-chart diagram of at least a portion of another embodiment of a method 200 according to aspects of the present disclosure. The method 200 may be or comprise a method of processing a phone call according to aspects of the present disclosure. The method 200 includes receiving a phone call in a step 110. The phone call and receipt thereof may substantially be as described above with respect to the method 100. The method 200 may also be substantially similar to the method 100. In one embodiment according to aspects of the present disclosure, aspects of the method 100 and the method 200 may be combined.

The method 200 also includes retrieving the caller's phone number in a step 120 in a manner substantially similar to that described above with respect to the method 100. However, the method 200 also includes retrieving a customer identification or identifier (collectively referred to herein as a customer ID) in a step 225. The customer ID may be a unique numeric or alphanumeric identifier specific to the customer. Thus, as with the description of the caller's phone number above, the customer ID may be indicative of the caller's identity.

For example, the customer may have previously enrolled in a customer loyalty, frequent customer, or other type of program (hereafter collectively referred to as a merchant program) in which a customer ID is assigned to or selected by each program member. One or more records for each customer ID may be maintained in a database or other data storage means, wherein the records may comprise information pertaining specifically to the customer associated with the customer ID, possibly including the customer's biographical data and/or transaction history, among other possible information. The customer ID may be, include, or be based on one or more different data, such as a customer number in a particular merchant program, a telephone or cellular phone number, a customer zip code or other address portion, a customer email address, a customer website address, a customer PIN, and/or a generic customer identifier not necessarily tied to any program, among others.

If the customer does not have a customer ID, or if for some other reason the call processing system fails to obtain the customer ID, the call may be transferred to a default location, such as to a human representative or a standard menu, to route the call by default parameters and/or to complete the customer service transaction. Thus, if no customer ID is retrieved in step 225, one or more messages subsequently delivered to the caller may be standard or default messages, or the messages may be selected based on selection criteria other than a customer ID, such as the caller's phone number, as described above with respect to FIG. 1.

The customer ID may also be obtained from information provided by the caller (e.g., via spoken or keyed response) and/or by a database lookup employing the caller's phone number. As with the verification described above with regard to the caller's phone number, the customer ID may be verified in step 225 or another step in the method 200. For example, the customer ID may be retrieved from a database and from the caller and then compared to verify the identity of the caller.

The method 200 also includes a step 230 in which one or more messages are automatically selected for delivery to the caller based on the customer ID retrieved in step 225. Thus, as with the automatic message selection described above with reference to FIG. 1, the one or more messages automatically selected for delivery in step 230 may be based on the caller's identity, because the customer ID may have a one-to-one correspondence with the caller.

The one or more messages automatically selected for delivery to the caller in step 230 are myriad. For example, the customer ID may indicate the caller's participation or enrollment in a particular program which, at the time of the call, may have a special promotion on certain products or services offered by the merchant, owner, or operator of the call processing system by which the method 200 is implemented. Thus, one message which may be selected for delivery based on the customer ID may include the details of the special promotion. Another message which may be selected for delivery to the caller based on the customer ID may be a review of the caller's account information, such as the number of miles and/or points earned by the customer in the merchant program.

Figure 3:
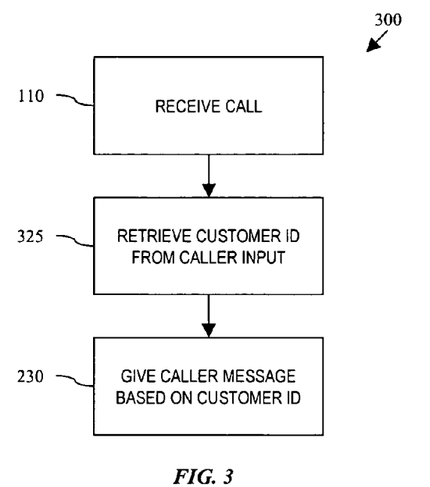
FIG. 3 is a flow-chart diagram of at least a portion of another embodiment of a method according to aspects of the present disclosure.

Referring to FIG. 3, illustrated is a flow-chart diagram of at least a portion of another embodiment of a method 300 according to aspects of the present disclosure. The method 300 may be or comprise a method of processing a phone call according to aspects of the present disclosure. The method 300 includes receiving a phone call in a step 110. The phone call and receipt thereof may substantially be as described above with respect to the method 100. The method 300 may also be substantially similar to the method 100. In one embodiment according to aspects of the present disclosure, aspects of the method 100, the method 200, and/or the method 300 may be combined.

The method 300 also includes retrieving a customer ID from the caller's input via keyed or spoken response in a step 325, in contrast to retrieving the customer ID automatically based on the caller's phone number, as described above. However, the retrieval of the customer ID in step 325 may also be at least partially automated, with the exception of the caller's physical or spoken input of data. For example, a recorded request may be played, asking the caller to speak or key in their customer ID. After receiving the caller's response, one or more messages automatically selected based on the customer ID may be presented to the caller in a step 230, as described above. Such messages may be substantially similar to those described above. Accordingly, custom messages may be automatically selected for delivery to the caller without requiring the retrieval of the caller's phone number. Moreover, as with embodiments described above, the messages presented to the caller in step 230 may be automatically selected based on the caller's identity.

Figure 4:
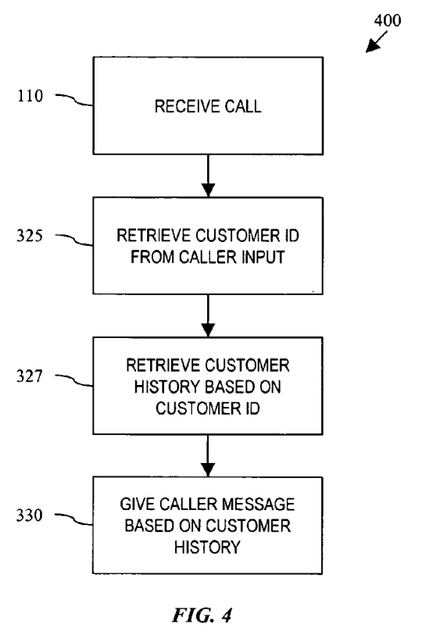
FIG. 4 is a flow-chart diagram of at least a portion of another embodiment of a method according to aspects of the present disclosure.

Referring to FIG. 4, illustrated is a flow-chart diagram of at least a portion of another embodiment of a method 400 according to aspects of the present disclosure. The method 400 may be or comprise a method of processing a phone call according to aspects of the present disclosure. The method 400 includes receiving a phone call in a step 110. The phone call and receipt thereof may substantially be as described above with respect to the method 100. The method 400 may also be substantially similar to the method 100. In one embodiment according to aspects of the present disclosure, aspects of the method 100, the method 200, the method 300, and/or the method 400 may be combined.

The method 400 also includes retrieving the caller's customer ID in a step 325, possibly in a manner substantially similar to that described above. However, the method 400 also includes a step 327 in which customer history information may be retrieved based on the customer ID. The historical information may also or alternatively be retrieved based on the caller's phone number. Consequently, the historical information may be specific to the caller's identity.

The customer history information retrieved in step 327 may comprise information pertaining to previous transactions requested by or otherwise corresponding to the customer. For example, the customer history information may comprise information pertaining to products or services previously purchased by the customer. The customer history information may also or alternatively comprise information pertaining to a pending transaction corresponding to the customer. For example, the customer may have previously executed or requested a reservation or purchase order, and the customer history information may pertain to this previous request.

The method 400 also includes a step 330 in which one or more messages are automatically selected for delivery to the customer based on the customer history information retrieved in step 327 and, consequently, based on or otherwise pertaining specifically to the caller's identity. For example, if the customer previously purchased a service or a quantity of widgets, the message may comprise an option to purchase the service again, the option to purchase an additional quantity of the widgets, and/or the option to initiate a new transaction having one or more aspects similar to the previous transaction. In one embodiment, the customer history information may comprise information pertaining to a pending transaction corresponding to the customer, and the message selected based on such information may present the customer the option to verify and/or edit details regarding the pending transaction, or to cancel the pending transaction.

Figure 5:
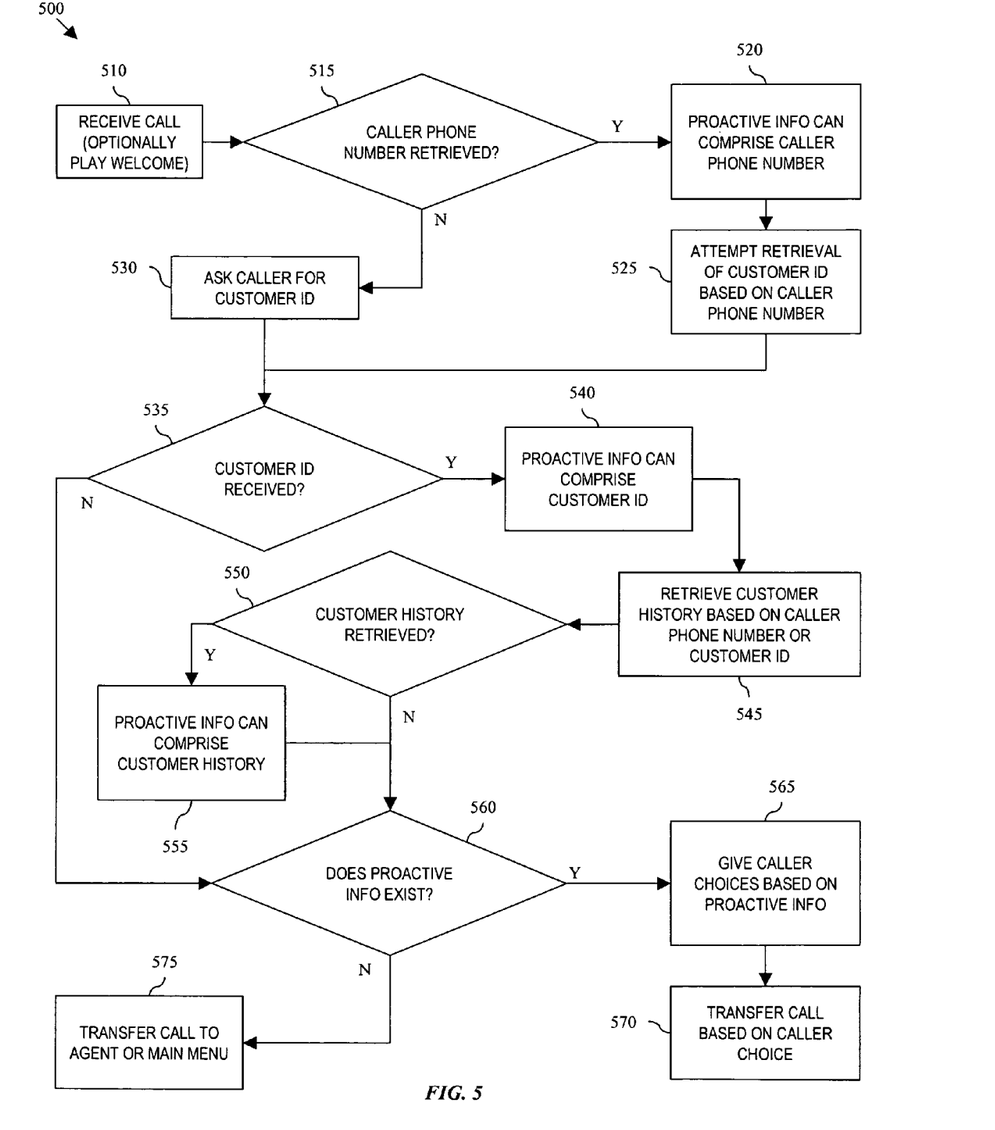
FIG. 5 is a flow-chart diagram of at least a portion of another embodiment of a method according to aspects of the present disclosure.

Referring to FIG. 5, illustrated is a flow-chart diagram of at least a portion of another embodiment of a method 500 according to aspects of the present disclosure. The method 500 may be or comprise a method of processing a phone call according to aspects of the present disclosure. The method 500 includes receiving a phone call in a step 510, possibly in a substantially similar manner to the call receipt in step 110 discussed above. The method 500 may also be substantially similar to the methods described above. For example, aspects of the method 100, the method 200, the method 300, and/or the method 400 may be combined with aspects of the method 500.

The receipt of the phone call in step 510 may trigger the delivery of a welcome message to the caller. For example, one possible welcome message may be: "Thank you for calling John Doe's Widget Services."

The method 500 may include retrieving the caller's phone number after or substantially simultaneously with receiving the call, possibly in a manner substantially similar to the phone number retrieval described above (e.g., by keyed or spoken response or database query). The caller's phone number may also be automatically retrieved or received, such as through the use of an ANI service, among other ways. If the caller's phone number is retrieved, as determined in the decisional step 515, a step 520 may be performed, wherein at least a portion of the retrieved phone number may be included in proactive information subsequently employed in the method 500. The inclusion of the caller's phone number or portion thereof in the proactive information in step 520 may be automatic. Because the proactive information may include the caller's phone number, the proactive information may be specific to or otherwise indicate or be based on the caller's identity.

If the caller's phone number is received, an attempt to retrieve the caller's customer ID may also be performed in a step 525, possibly in a manner substantially similar to the customer ID retrieval described above (e.g., by keyed or spoken response or database query). The attempt to retrieve the customer ID may also be automatic, and may be based on or employ the caller's previously retrieved phone number. However, if the caller's phone number is not retrieved, as determined in step 525, a request for the caller's customer ID may be delivered to the caller in a step 530.

A subsequent decisional step 535 may comprise determining whether the caller's customer ID was retrieved in step 525 or step 530. If the caller's customer ID was not retrieved, a decisional step 560 may be performed. However, if it is determined in step 535 that the caller's customer ID was retrieved, a step 540 may be performed, wherein at least a portion of the retrieved customer ID may be included in proactive information subsequently employed in the method 500. The inclusion of the customer ID or portion thereof in the proactive information in step 540 may be automatic. Because the proactive information may include at least a portion of the caller's customer ID, the proactive information may be specific to or otherwise indicate or be based on the caller's identity.

An attempt to retrieve historical information pertaining to the caller may be performed in a step 545 if the customer ID was retrieved in an earlier step. Such information may comprise details of previously conducted transactions and/or currently pending but not necessarily completed transactions, including the exemplary historical customer information described above. The attempted retrieval of the customer's historical information in step 545 may be performed in a substantially similar manner to the historical information retrieval in embodiments described above, including in an automatic manner.

A decisional step 550 may comprise determining whether any historical information corresponding to the caller was retrieved in step 545. If such historical information was retrieved, a step 555 may be performed, wherein at least a portion of the retrieved historical information may be included in proactive information subsequently employed in the method 500. The inclusion of the retrieved historical information or portion thereof in the proactive information in step 555 may be automatic. If no historical information is received in step 545, step 560 may be performed.

Decisional step 560 comprises determining whether any proactive information has been obtained in a previous step. As described above, the proactive information may comprise the caller's phone number or portion thereof, the caller's customer ID or portion thereof, and/or the caller's historical information or portion thereof. However, aspects of the method 500 and/or other methods disclosed herein are applicable or readily adaptable to obtaining other types of information that may be included in the proactive information, including the city of residence and/or other biographical information about the caller, the name of the caller, the name of the customer corresponding to the phone number or other proactive information obtained during the call, special needs of the caller, account balance and other details regarding a merchant program in which the caller is enrolled, and others.

If it is determined in step 560 that no proactive information has been obtained, the call may be transferred to an agent or to a main menu, such as one which delivers standard messages to the caller. However, if it is determined in step 560 that proactive information has been obtained during a previous step, customer choices or messages automatically selected based on the proactive information may be delivered to the caller in a step 565. For example, if the proactive information comprises information pertaining to a pending transaction corresponding to the caller, the customer may be automatically presented with the option to review and/or edit details of the pending transaction. If the proactive information comprises information pertaining to the caller's customer ID, the customer ID may indicate that the caller is enrolled in a merchant program, and the customer may be automatically presented with promotions currently available to participants in the merchant program. Other examples of messages automatically selected and delivered to the caller include those described above and as described below.

Upon presenting the automatically selected messages or choices to the caller, the caller may select one of the presented options, such as by keyed or spoken response. Thereafter, the caller or call may be transferred based on the caller's choice in a step 570. In one embodiment, such transfer may include transferring the call to another application.

Examples of applications between which the call may be transferred in step 570 may vary depending on the particular utility of the system employing or executing the method 500. In one embodiment, the system may be a call-processing system operated for an airline or airline travel industry entity. In such an embodiment, the applications between which calls may be transferred in step 570 may include a baggage handling or lost/mishandled article application, a pet information application, and an application pertaining to information on unaccompanied minors. Other example applications may include an application for performing or securing upgrades (such as upgrades to existing flight bookings or reservations), a reconfirmation application for confirming the status of a flight booking or reservation, and a blocking application to which a call may be transferred if another application to which it is desired to transfer a call is too busy or overloaded with existing calls such that the caller may be requested to hold or call back at a later time. Another possible type of application is a routing application configured to retrieve information from the caller or a database query, possibly as a intermediary transfer before transfer to a desired application. Another example application may be a security documentation application which may be configured to prevent a customer's reservation or other account information from being accessed or modified by anyone other than the customer. Another type of security documentation application may record the phone number of the person calling to modify a reservation or account information, such that this phone number may subsequently be compared with other information to verify the identity of the person.

In the embodiment in which the call-processing system corresponds to an airline, applications to which calls may be transferred may correspond to other types of travel, such as bus travel, rail travel, car rental, and others, including applications which may be physically located outside the airline call-processing system. Thus, each application may be stored on, executed by, or otherwise correspond to a separate server or other computer hardware, including those that are remotely located.

The method 500, as well as any other method disclosed herein, may include steps in addition to and/or in the alternative to those explicitly described herein within the scope of the present disclosure. The sequences of steps in the methods described herein may also vary within the scope of the present disclosure. The scope of the present disclosure also includes methods comprising a combination of steps and/or aspects of the method 500 or any of the other methods disclosed herein with steps and/or aspects of any other method disclosed herein, among others.

Figure 6:
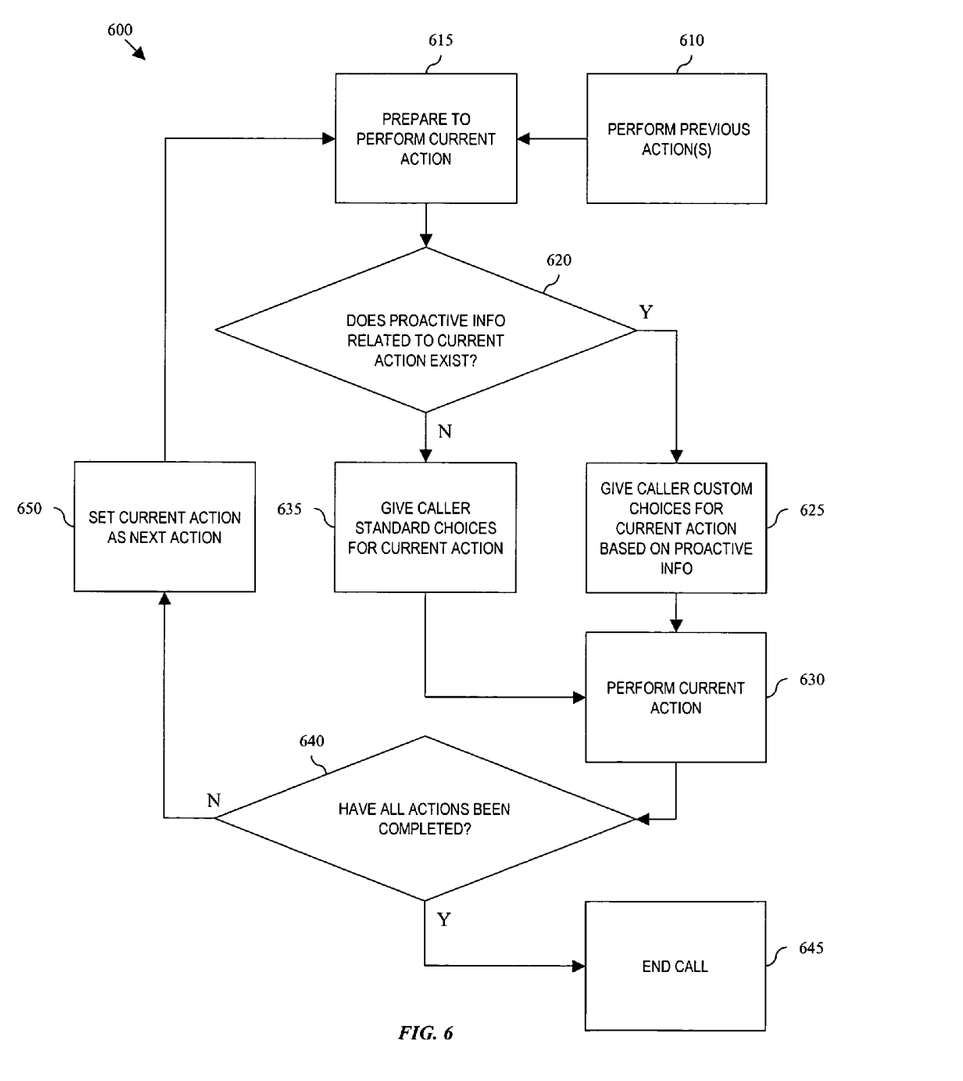
FIG. 6 is a flow-chart diagram of at least a portion of another embodiment of a method according to aspects of the present disclosure.

Referring to FIG. 6, illustrated is a flow-chart diagram of at least a portion of another embodiment of a method 600 according to aspects of the present disclosure. The method 600 may be or comprise a method of processing a phone call according to aspects of the present disclosure. The method 600 may be substantially similar to the methods described above. For example, aspects of the method 100, the method 200, the method 300, the method 400, and/or the method 500 may be combined with aspects of the method 600.

The method 600 includes a step 610 representing the performance of one or more previous actions during a call initiated by a caller to the system by which the method 600 is implemented. Examples of previous actions may include methods and/or steps performed in the course of making new reservations, changing or canceling existing reservations, redeeming or purchasing merchant program points, updating biographical information or other information in a customer account, and others.

Preparations to conduct a current action may be made in a step 615. The current action may be similar to any of the examples of previous actions described above, although the current action has not yet been performed. In a decisional step 620, it is determined whether any proactive information related to the current action exists. For example, such proactive information may be retrieved or otherwise obtained according to aspects of one or more of the methods 100, 200, 300, 400, 500 described above, and may comprise the caller's phone number, the caller's customer ID, and/or historical transaction information related to the caller, among other possible information.

If it is determined in step 620 that proactive information pertaining to the caller and the current action exists, the caller may be automatically presented with choices and/or messages related to the current action and automatically selected based on the proactive information in a step 625, possibly as described with respect to other methods described above. The current action may then be performed or executed in a step 630, possibly based on the caller's response to the options presented to the caller in step 625. However, if it is determined in step 620 that no proactive information pertaining to the current action exists, the current action may be performed or executed in step 630 without the automatic selection and/or delivery of options to the caller. However, in some embodiments, bypassing step 625 because no proactive information pertaining to the current action is available may delay the execution of the current action, or may increase the time required to execute the current action. However, these characteristics may not be exhibited in every embodiment within the scope of the present disclosure.

In a decisional step 640, it is determined whether all actions necessary to complete the call have been performed. If all such actions have been completed, the call may end in a subsequent step 645. However, if unperformed actions remain, or if the caller's needs have not been completely attended to, the "current action" in the method 600 may be set to the next action requiring execution, and at least a portion of the method 600 may be repeated.

Figure 7:
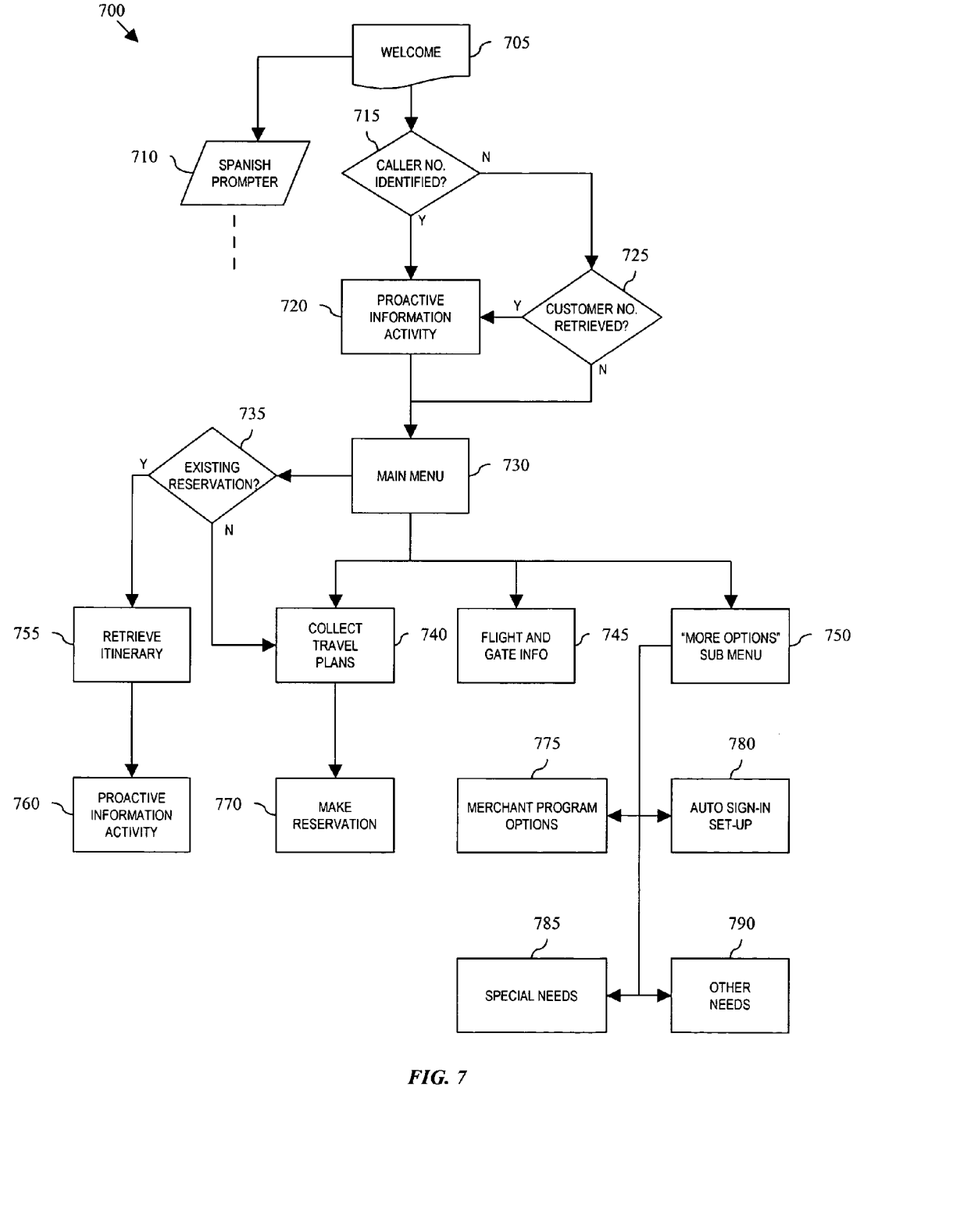
FIG. 7 is a flow-chart diagram of at least a portion of another embodiment of a method according to aspects of the present disclosure.

Referring to FIG. 7, illustrated is a flow-chart diagram of at least a portion of another embodiment of a method 700 according to aspects of the present disclosure. The method 700 may be or comprise a method of processing a phone call according to aspects of the present disclosure. The method 700 may be substantially similar to the methods described above. For example, aspects of the method 100, the method 200, the method 300, the method 400, the method 500, and/or the method 600 may be combined with aspects of the method 700, and may also be combined to form at least a portion of the method 700.

The method 700 includes a step 705 in which a welcome message may be delivered to the caller. The welcome step 705 or another step in the method 700 may include delivering to the caller an option to conduct the remainder of the call in Spanish or another language, in which case a Spanish or other language prompter may be initiated, such as in a step 710. Subsequent processing of the call in another language may be substantially similar to the following description regarding conducting the remainder of the call in English. Accordingly, only the English portion of the method 700 will be described herein.

In a decisional step 715, it is determined whether the caller's phone number has been identified or otherwise retrieved, possibly in a manner substantially similar to the phone number receipt or retrieval described above. If it is determined in step 715 that the caller's phone number has been retrieved, proactive information based on the caller's phone number may be conducted in a step 720. Such proactive information activity may be substantially similar to those actions described above that are based, at least in part, on the caller's phone number or other proactive information. Other examples of proactive information activity may include greeting the caller by name and/or delivering information regarding inclement weather, flight delays, and/or promotions, where such activities are automatically selected and/or performed based on the caller's phone number or other proactive information. If the proactive information activity performed in step 720 includes receiving a response from the caller, the response or information related thereto or based thereon may be forwarded for subsequent use in the method 700, such as with a main menu application in step 730.

If it is determined in step 715 that the caller's phone number has not been retrieved, a decisional step 725 may be performed to determine if the caller's customer ID has been identified or otherwise retrieved, possibly in a manner substantially similar to the customer ID retrieval described above. If it is determined in step 725 that the caller's customer ID has been retrieved, the proactive information activity of step 720 may by substantially similar to the actions described above that are based, at least in part, on the caller's customer ID (and/or other proactive information). Upon the completion of any proactive information activity performed in step 720, the call may be transferred to the main menu application in step 730. If it is determined in step 725 that the caller's customer ID has not been retrieved, the call may be transferred to the main menu application in step 730 without the performance of any proactive information activity.

From the main menu application in step 730, the caller may be given choices pertaining to the type of transaction or inquiry forming the impetus for the caller to initiate the call and/or choices related to the most-often-used features of the system in which the method 700 is implemented. For example, in the embodiment shown in FIG. 7, the caller may be given the option to be transferred to a reservations application via a decisional step 735, to a travel plans application via a step 740, to a flight information application via a step 745, or to a sub-menu application via a step 750. The option to be transferred to such applications may be based on one or more spoken and/or keyed responses received from the caller in step 730, and may also or alternatively be based on proactive information previously received, including proactive information forwarded in step 720.

Decisional step 735 comprises determining whether the caller has an existing reservation. For example, the caller may have previously made one or more reservations, and in a subsequent step 755 the itineraries and/or other information regarding the one or more reservations may be automatically retrieved, possibly based on proactive information previously obtained in the method 700. Thereafter, proactive information activity may be performed in a step 760. As with step 720 above, the proactive information activity performed in step 760 may comprise automatically selecting options, choices, and/or messages to be delivered to the caller based on the caller's phone number, customer ID, historical transaction information, earned points in a merchant program, and/or other proactive information, among other information.

For example, step 760 may comprise automatically delivering to the caller a summary and/or details of an itinerary, wherein the summary and/or details or portions thereof may be automatically retrieved based on proactive information. The proactive information activity performed in step 760 may also or alternatively include automatically presenting the caller with options to review, upgrade, or otherwise modify a reservation, wherein such options may be selected for delivery and/or delivered based on the number of merchant program points the caller has earned and/or on an indicator that the caller is enrolled in a particular merchant program. The caller may also be automatically presented with options to review and/or modify details such as airline flight times and gates, airline flight seat assignments and class (e.g., first class, business class, etc.), and/or other details, wherein such options may be based on the caller's historical transaction information or other proactive information. The caller may also be automatically presented with options to cancel a particular reservation, wherein such options may also be based proactive information.

The proactive information activity performed in step 760 may also or alternatively include automatically selecting messages for delivery to the caller based on personal characteristics of the caller included in the previously obtained proactive information. For example, automatically selected options, choices, and/or messages may pertain to special needs of the caller, such as if the caller is traveling with small children or pets, or if the caller or traveler is at least or less than a predetermine age, or if the caller has special medical needs.

Additional activity may be performed in step 760 or other steps prior to cessation of the call. Such information may comprise delivering standard messages to the caller, as well as automatically selecting and/or delivering other messages based on proactive information, but not necessarily explicitly disclosed herein.

If it is determined in step 735 that the caller does not have an existing reservation or other type of pending transaction, the caller's travel plans or other details regarding a requested transaction may be collected in step 740. Such information may be received in the form of one or more spoken and/or keyed responses, and may be at least temporarily stored for use during subsequent steps in the method 700. For example, such information may comprise travel destinations and preferred travel dates and times, a requested airline flight class (e.g. first class, business class, etc.), preferred seating assignments, meal requests, dietary needs or requests, medical needs, and/or other information. The information collected in step 740 may also comprise information pertaining to special needs of the caller, such as if the caller is traveling with young children or pets, is at least a predetermined age, or has special medical needs.

After information is collected in step 740, the call may be transferred to a reservation application in a step 770. The activities performed in step 770 may be performed automatically, such as through a human-machine interface, or may be performed by a human agent. Step 770 may comprise making new reservations for the caller based on the information obtained in step 740. For example, the new reservation may be based on a previous reservations, such that the new and old reservations may have similar departure and/or arrival locations, flight times, gates, airlines, or other reservation details. The information obtained in step 740 may be automatically forwarded for use during activities performed in step 770. For example, in addition to the information obtained in step 740, if any, proactive information previously obtained in the method 700 may be employed during activities performed in step 770. Step 770 may also comprise modifying a caller's account in a merchant program, such as to debit or credit a balance of points the caller has earned in a merchant program, or verifying, correcting, or supplementing biographical information of the caller.

The flight and gate information application accessed in step 745 may permit callers to review information about airline flights and departure/arrival gates corresponding thereto, such as at one or more particular airports or for one or more particular airlines. The activities performed in step 745 may comprise delivering messages to the caller in response to proactive information and/or in response to other information received from the caller during the call, such as keyed or spoken responses, including information indicating a particular airport, airline, travel destination, block of time, flight number, etc. However, all embodiments within the scope of the present disclosure do not necessarily include this option.

The sub-menu application accessed in step 750 may provide the caller with options in addition to those provided in the main menu application accessed in step 730. In one embodiment, the options presented to the caller in the sub-menu application of step 750 may be less frequently accessed options or applications relative to those accessible from the main menu application in step 730. Examples may include: reviewing, redeeming, and/or purchasing additional points in a merchant program, as in a step 775; registering, setting up, or otherwise configuring an automatic sign-in or other feature of a merchant program, such as the present or other call processing systems or a web interface for the merchant program, as in a step 780; reviewing guidelines and/or making arrangements for special needs, such as if a caller or traveler is traveling with small children or pets, is at least or less than a predetermined age, or has special medical needs, as in a step 785; and attending to other needs, options, or less-frequently accessed applications, such as registering or reviewing a lost or mishandled article claim, as in a step 790. Another example may be verifying the status of a reservation or booking upgrade request. Each of these activities may also employ proactive information, such that one or more options, choices, or messages delivered to the caller during such activities may be automatically selected and/or delivered to the caller based on proactive information previously obtained during execution of the method 700.

Figure 8:
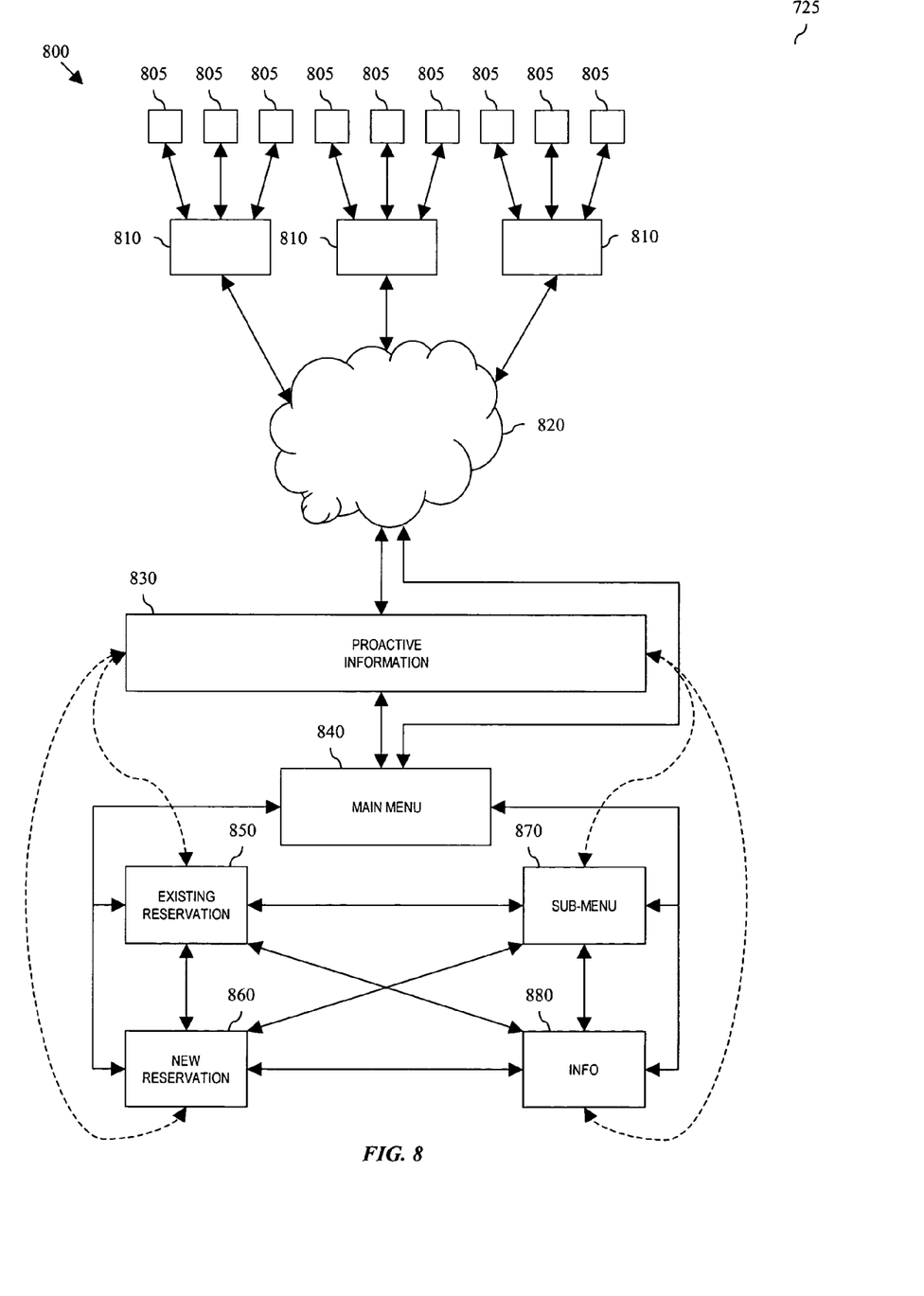
FIG. 8 is a block diagram of at least a portion of one embodiment of a system according to aspects of the present disclosure.

Referring to FIG. 8, illustrated is at least a portion of one embodiment of a system 800 in and/or by which the methods described above may be implemented. The system 800 may include or be accessible by one or more access devices 805 by which a caller may initiate a reservation query or other transaction. In some embodiments, the access devices 805 may not be integral to the system 800, but may be remote devices temporarily in communication with a network 820 to access or otherwise work in conjunction with the system 800. The access devices 805 may each be a telephone, computer, personal digital assistant (PDA), or other device configured to allow wired or wireless access to the system 800 by the caller, and may be configured to provide voice and/or data signals to the system 800, including via dual tone multi-frequency (DTMF), touch-tone, or other type of key pad or user-input device.

The system 800 may also include or be accessible through one or more access points 810, which may each be a private or public branch exchange and/or other type of telephone exchange or switch. As with the access devices 805, the access points 810 may not be integral to the system 800, but may be remote devices through which temporary communication with the network 820 may be achieved, when employed.

The system 800 may also include or be accessible through the network 820, which is configured to allow communication between the access devices 805 and other components in the system 800. The network 820 may be wired, wireless, or a combination thereof, and may be or comprise one or more of a local-area-network (LAN), a wide-area-network (WAN), and/or or other conventional and/or future-developed network types. Moreover, one or more of the networks represented by the network 820 in FIG. 8 may be centrally or remotely located relative to each other and/or the remainder of the system 800.

The system 800 also includes a proactive information application or module (hereafter collectively referred to as a proactive information application) 830. In one embodiment, multiple proactive information applications (collectively referred to herein as the proactive information application) may be included in the system 800 and connected or integral to another one of more corresponding applications. The proactive information application 830 may be configured to obtain proactive information in a manner substantially similar to methods described above. For example, the proactive information application 830 may automatically retrieve proactive information from an ANI service or database query, such as the caller's phone number, customer ID, historical transaction history, merchant program enrollment information and/or related details, or other information pertaining or corresponding to the caller. The proactive information application 830 may be accessed by various other components, modules, or applications (collectively referred herein to as an application or applications) in the system 800, or may automatically provide proactive information to various applications in the system 800, such as when a call is transferred to an application.

The system 800 also includes a main menu application 840. The main menu application 840 may be accessed directly from the network 820, such as when no proactive information exists for a particular caller. However, the main menu application 840 may also be accessed indirectly from the network 820 through the proactive information application 830, such as when proactive information corresponding to a caller may be transferred to the main menu application 840 with a call. The main menu application 840 may direct a call to other applications in the system 800 based on proactive information and/or other information received from the caller. For example, a call may be transferred from the main menu application 840 to an existing reservation application 850, a new reservation application 860, a sub-menu application 870, and/or an information application 880.

The existing reservation application 850 may be accessed to review, modify, and/or cancel existing reservations corresponding to a caller. The new reservation application 860 may be accessed to make new reservations. The sub-menu application 870 may be accessed to perform other, possibly less-frequently performed activities in the system 800. The information application 880 may be accessed to review information pertaining to activities performed or related to the system. The system 800 may include additional or alternative applications not explicitly disclosed herein as well as multiple instances of any application described above. Moreover, one or more of the applications in the system 800 may be located remote from other applications in the system 800.

Activities performed by the applications 840, 850, 860, 870, 880 may include automatically delivering options, choices, or messages to a caller based on proactive information, as well as the automatic selection of such options, choices, or messages based on proactive information. Consequently, calls may also be transferred between each of the applications 840, 850, 860, 870, 880 described above, and any such transfer may also include the transfer of proactive information. Such transfers may also be in response to a caller response to an option, choice, or message selected and delivered to the caller based on proactive information.

Figure 9:
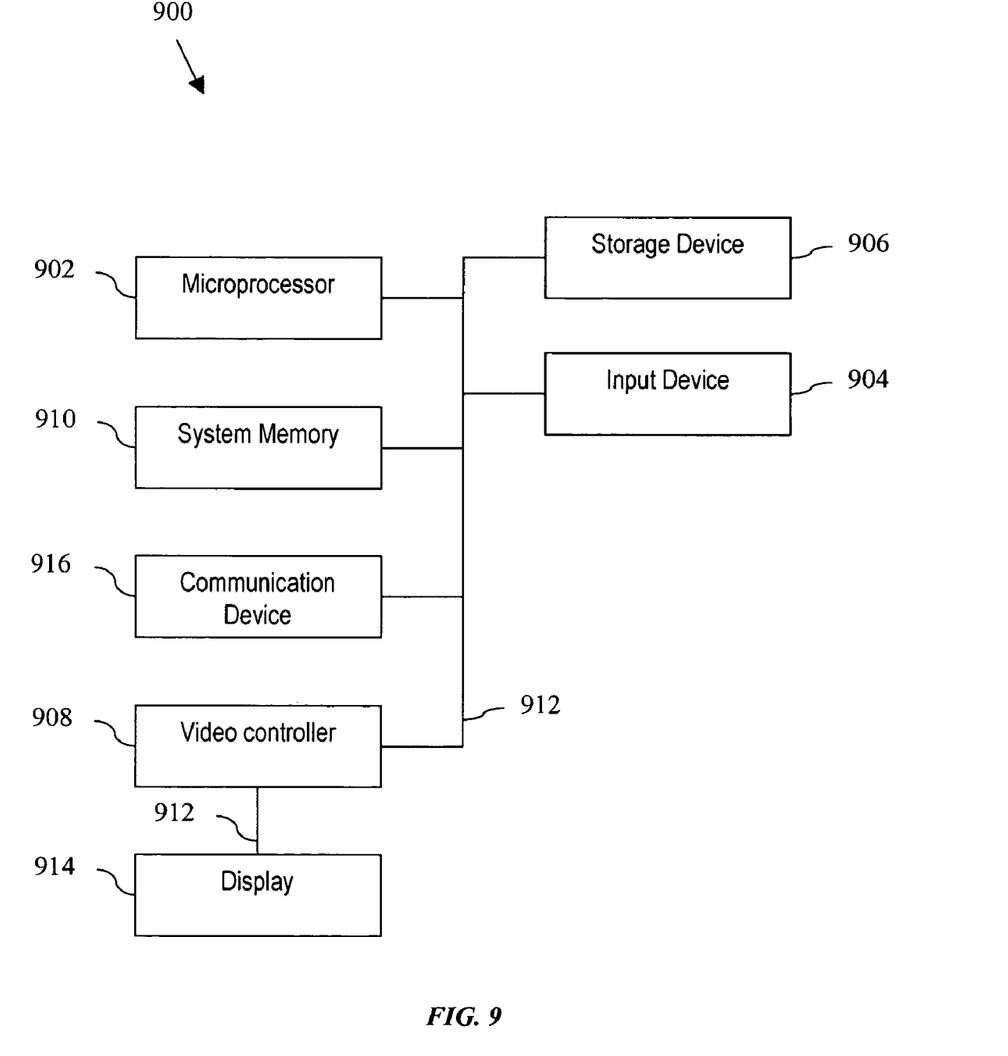
FIG. 9 is a block diagram of at least a portion of one embodiment of a node for implementing aspects of the present disclosure.

Referring to FIG. 9, an illustrative node 900 for implementing one or more embodiments of the methods described herein is depicted. Node 900 includes a microprocessor 902, an input device 904, a storage device 906, a video controller 908, a system memory 910, a display 914, and a communication device 916 all interconnected by one or more buses 912. The storage device 906 may be a floppy drive, hard drive, CD-ROM, optical drive, or any other form of storage device. In addition, the storage device 906 may be capable of receiving a floppy disk, CD-ROM, DVD-ROM, or any other form of computer-readable medium that may contain computer-executable instructions. Communication device 916 may be a modem, network card, or any other device to enable the node 900 to communicate with other nodes. It is understood that any node could represent a plurality of interconnected (whether by intranet or Internet) computer systems, including, without limitation, personal computers, mainframes, PDAs, and cell phones.

A computer system typically includes at least hardware capable of executing machine readable instructions, as well as software for executing acts (typically machine-readable instructions) that produce a desired result. In addition, a computer system may include hybrids of hardware and software, as well as computer sub-systems.

Hardware generally includes at least processor-capable platforms, such as client-machines (also known as personal computers or servers), and hand-held processing devices (such as smart phones, PDAs, and personal computing devices (PCDs), for example). Furthermore, hardware typically includes any physical device that is capable of storing machine-readable instructions, such as memory or other data storage devices. Other forms of hardware include hardware sub-systems, including transfer devices such as modems, modem cards, ports, and port cards, for example. Hardware may also include, at least within the scope of the present disclosure, multi-modal technology, such as those devices and/or systems configured to allow users to utilize multiple forms of input and output—including voice, keypads, and stylus—interchangeably in the same interaction, application, or interface.

Software may include any machine code stored in any memory medium, such as RAM or ROM, machine code stored on other devices (such as floppy disks, or a CD ROM, for example), and may include executable code, an operating system, as well as source or object code, for example. In addition, software may encompass any set of instructions capable of being executed in a client machine or server—and, in this form, is often called a program or executable code.

Hybrids (combinations of software and hardware) are becoming more common as devices for providing enhanced functionality and performance to computer systems. A hybrid may be created when what are traditionally software functions are directly manufactured into a silicon chip—this is possible since software may be assembled and compiled into ones and zeros, and, similarly, ones and zeros can be represented directly in silicon. Typically, the hybrid (manufactured hardware) functions are designed to operate seamlessly with software. Accordingly, it should be understood that hybrids and other combinations of hardware and software are also included within the definition of a computer system herein, and are thus envisioned by the present disclosure as possible equivalent structures and equivalent methods.

Computer-readable mediums may include passive data storage such as a random access memory (RAM), as well as semi-permanent data storage such as a compact disk read only memory (CD-ROM). In addition, an embodiment of the present disclosure may be embodied in the RAM of a computer and effectively transform a standard computer into a new specific computing machine.

Data structures are defined organizations of data that may enable an embodiment of the present disclosure. For example, a data structure may provide an organization of data or an organization of executable code (executable software). Furthermore, data signals are carried across transmission mediums and store and transport various data structures, and, thus, may be used to transport an embodiment of the invention. It should be noted in the discussion herein that acts with like names may be performed in like manners, unless otherwise stated.

The systems of the present disclosure may be designed to work on any specific architecture. For example, the system may be executed on a single computer, Ethernet networks, local area networks, a wide area network, internets, hand-held and other portable and wireless devices and networks.

A database may be embodied in or employ any standard or proprietary database software, such as SQL, MSSQL, Oracle, Microsoft Access, SyBase, or DBase II, for example. Accordingly, a database has fields, records, data, and other database elements which may be associated through database specific executable software code. Mapping is the process of associating one data entry with another data entry. For example, the data contained in the location of a character file can be mapped to a field in a second table. The physical location of databases and other storage devices is not limited herein, and such databases and other storage devices may be distributed. For example, a database may exist remotely from the server, or run on a separate platform that is accessible across the Internet. Note that more than one database may be implemented in an architecture.

While the examples and naming conventions used herein may, at times, be related to air travel, it is understood that the system and method embodiments described herein are applicable or readily adaptable for use in any form of travel, hospitality, and/or logistics industry, including rail, cruise-ship, shipping, hotel, rental car, and busing industries.

In general, the present disclosure introduces a method of processing a call initiated by a caller and received by a call processing system wherein information pertaining specifically to the caller is obtained, at least one message is selected automatically and based on the obtained information, and the at least one message is automatically presented to the caller, among other aspects. In at least one embodiment, the obtained information upon which the at least one message is automatically selected may also be automatically obtained. Such automatically obtained information may also be obtained based on or employ previously obtained information, including previously obtained information that was also automatically obtained.

The present disclosure also provides a system for processing a call initiated by a caller and received by a call processing system. In one embodiment, the system includes means for obtaining information pertaining specifically to the caller, means for automatically selecting at least one message based on the obtained information, and means for automatically presenting the selected at least one message to the caller.

A computer-readable medium comprising a series of instructions for execution by at least one computer processor is also disclosed herein. In one embodiment of such a computer-readable medium, the instructions are for obtaining information pertaining specifically to the caller, automatically selecting at least one message based on the obtained information, and automatically presenting the selected at least one message to the caller.

The foregoing has outlined features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method of processing a caller-initiated call, the method comprising:

receiving the caller-initiated call with a call processing system, the call processing system comprising a node and a network configured to allow communication between the node and at least one access device, the node comprising:

a microprocessor; and a storage unit operably coupled to the microprocessor, the storage unit containing a plurality of computer-executable instructions;

and in response to receiving the caller-initiated call, executing the computer-executable instructions with the microprocessor so that the following steps are automatically executed by the call processing system:

determining whether a telephone number from which the caller initiated the call has been retrieved in response to receiving the caller-initiated call;

if the telephone number from which the caller initiated the call has been received, then determining whether a customer ID specific to the caller has been retrieved in response to receiving the telephone number from which the caller initiated the call;

if the telephone number from which the caller initiated the call has not been retrieved, then:
  requesting from the caller the customer ID specific to the caller; and
  determining whether the customer ID specific to the caller has been retrieved in response to requesting from the caller the customer ID specific to the caller;

if the telephone number from which the caller initiated the call, and the customer ID specific to the caller, have been retrieved, then:
  determining whether historical transaction information specific to the caller and based on at least the telephone number and the customer ID has been retrieved;
  if the historical transaction information specific to the caller and based on at least the telephone number and the customer ID has been retrieved, then:
    automatically presenting at least one message to the caller, the at least one message being based on:
      the telephone number from which the caller initiated the call;
      the customer ID specific to the caller; and
      the historical transaction information specific to the caller and based on at least the telephone number and the customer ID;
  and
  if the historical transaction information specific to the caller and based on at least the telephone number and the customer ID has not been retrieved, then:
    automatically presenting at least one message to the caller, the at least one message being based on:
      the telephone number from which the caller initiated the call;
      and
      the customer ID specific to the caller;

if the telephone number from which the caller initiated the call has been retrieved but the customer ID specific to the caller has not been retrieved, then:
  determining whether historical transaction information specific to the caller and based on at least the telephone number has been retrieved;
  if the historical transaction information specific to the caller and based on at least the telephone number has been retrieved, then:
    automatically presenting at least one message to the caller, the at least one message being based on:
      the telephone number from which the caller initiated the call;
      and
      the historical transaction information specific to the caller and based on at least the telephone number;
  and
  if the historical transaction information specific to the caller and based on at least the telephone number has not been retrieved, then:
    automatically presenting at least one message to the caller, the at least one message being based on:
      the telephone number from which the caller initiated the call;

if the telephone number from which the caller initiated the call has not been retrieved but the customer ID specific to the caller has been retrieved, then:
  determining whether historical transaction information specific to the caller and based on at least the customer ID has been retrieved;
  if the historical transaction information specific to the caller and based on the customer ID has been retrieved, then:
    automatically presenting at least one message to the caller, the at least one message being based on:
      the customer ID specific to the caller; and
      the historical transaction information specific to the caller and based on at least the customer ID;
  and
  if the historical transaction information specific to the caller and based on at least the customer ID has not been retrieved, then:
    automatically presenting at least one message to the caller, the at least one message being based on:
      the customer ID specific to the caller;
and
if neither the telephone number from which the caller initiated the call nor the customer ID specific to the caller has been retrieved, then:
  transferring the call to an agent or a main menu.

2. The method of claim 1 wherein the at least one message comprises a plurality of options, each of which is selectable by the caller; and
wherein executing the computer-executable instructions with the microprocessor comprises executing the computer-executable instructions with the microprocessor so that the following steps are automatically executed by the call processing system:
  determining whether the caller has selected an option in the plurality of options; and
  if the caller has selected the option, then:
    determining an action in response to the caller's selection of the option;
    determining whether the action is related to at least one of the telephone number, the customer ID, and the historical transaction information specific to the customer;
    if the action is related to the at least one of the telephone number, the customer ID, and the historical transaction information specific to the customer, then performing the action wherein the performance of the action is based on the at least one of the telephone number, the customer ID, and the historical transaction information specific to the customer;
    if the action is not related to the at least one of the telephone number, the customer ID, and the historical transaction information specific to the customer, then performing the action wherein the performance of the action is not based on the at least one of the telephone number, the customer ID, and the historical transaction information specific to the customer;
if another action must be performed in response to the caller's selection of the option, then:
(a) determining whether the another action is related to at least one of the telephone number, the customer ID, and the historical transaction information specific to the customer;
(b) if the another action is related to the at least one of the telephone number, the customer ID, and the historical transaction information specific to the customer, then performing the another action wherein the performance of the another action is based on the at least one of the telephone number, the customer ID, and the historical transaction information specific to the customer;
(c) if the another action is not related to the at least one of the telephone number, the customer ID, and the historical transaction information specific to the customer, then performing the another action wherein the performance of the another action is not based on the at least one of the telephone number, the customer ID, and the historical transaction information specific to the customer;
and
(d) repeating (a) through (c) until all actions that must be performed in response to the caller's selection of the option have been performed.

3. The method of claim 2 wherein the historical transaction information specific to the customer comprises an existing airline flight reservation; and
wherein the plurality of options comprises at least one of the following:
an option for reviewing the existing airline flight reservation;
an option for modifying the existing airline flight reservation; and
an option for canceling the existing airline flight reservation.

4. The method of claim 1 wherein the call is transferred to the main menu if neither the telephone number from which the caller initiated the call, nor the customer ID specific to the caller, has been retrieved; and
wherein the main menu comprises one or more of the following:
an option for transferring to an airline flight reservations application;
an option for transferring to an airline travel plans application;
an option for transferring to an airline flight information application; and
an option for transferring to a sub-menu application.

5. A system for processing a caller-initiated call, the system comprising:
means for receiving the caller-initiated call with a call processing system, the call processing system comprising a node and a network configured to allow communication between the node and at least one access device, the node comprising:
a microprocessor; and
a storage unit operably coupled to the microprocessor, the storage unit containing a plurality of computer-executable instructions;
and
means for in response to receiving the caller-initiated call, executing the computer-executable instructions with the microprocessor so that the following steps are automatically executed by the call processing system:
determining whether a telephone number from which the caller initiated the call has been retrieved in response to receiving the caller-initiated call;
if the telephone number from which the caller initiated the call has been received, then determining whether a customer ID specific to the caller has been retrieved in response to receiving the telephone number from which the caller initiated the call;
if the telephone number from which the caller initiated the call has not been retrieved, then:
requesting from the caller the customer ID specific to the caller; and
determining whether the customer ID specific to the caller has been retrieved in response to requesting from the caller the customer ID specific to the caller;
if the telephone number from which the caller initiated the call, and the customer ID specific to the caller, have been retrieved, then:
determining whether historical transaction information specific to the caller and based on at least the telephone number and the customer ID has been retrieved;
if the historical transaction information specific to the caller and based on at least the telephone number and the customer ID has been retrieved, then:
automatically presenting at least one message to the caller, the at least one message being based on:
the telephone number from which the caller initiated the call;
the customer ID specific to the caller; and
the historical transaction information specific to the caller and based on at least the telephone number and the customer ID;
and
if the historical transaction information specific to the caller and based on at least the telephone number and the customer ID has not been retrieved, then:
automatically presenting at least one message to the caller, the at least one message being based on:
the telephone number from which the caller initiated the call;
and
the customer ID specific to the caller;
if the telephone number from which the caller initiated the call has been retrieved but the customer ID specific to the caller has not been retrieved, then:
determining whether historical transaction information specific to the caller and based on at least the telephone number has been retrieved;
if the historical transaction information specific to the caller and based on at least the telephone number has been retrieved, then:
automatically presenting at least one message to the caller, the at least one message being based on:
the telephone number from which the caller initiated the call;
and the historical transaction information specific to the caller and based on at least the telephone number;
and
if the historical transaction information specific to the caller and based on at least the telephone number has not been retrieved, then:
automatically presenting at least one message to the caller, the at least one message being based on:
the telephone number from which the caller initiated the call;
if the telephone number from which the caller initiated the call has not been retrieved but the customer ID specific to the caller has been retrieved, then:
determining whether historical transaction information specific to the caller and based on at least the customer ID has been retrieved;
if the historical transaction information specific to the caller and based on the customer ID has been retrieved, then:
automatically presenting at least one message to the caller, the at least one message being based on:
the customer ID specific to the caller; and
the historical transaction information specific to the caller and based on at least the customer ID;
and
if the historical transaction information specific to the caller and based on at least the customer ID has not been retrieved, then:
automatically presenting at least one message to the caller, the at least one message being based on:
the customer ID specific to the caller;
and
if neither the telephone number from which the caller initiated the call nor the customer ID specific to the caller has been retrieved, then:
transferring the call to an agent or a main menu.

6. The system of claim 5 wherein the at least one message comprises a plurality of options, each of which is selectable by the caller; and
wherein executing the computer-executable instructions with the microprocessor comprises executing the computer-executable instructions with the microprocessor so that the following steps are automatically executed by the call processing system:
determining whether the caller has selected an option in the plurality of options; and
if the caller has selected the option, then:
determining an action in response to the caller's selection of the option;
determining whether the action is related to at least one of the telephone number, the customer ID, and the historical transaction information specific to the customer;
if the action is related to the at least one of the telephone number, the customer ID, and the historical transaction information specific to the customer, then performing the action wherein the performance of the action is based on the at least one of the telephone number, the customer ID, and the historical transaction information specific to the customer;
if the action is not related to the at least one of the telephone number, the customer ID, and the historical transaction information specific to the customer, then performing the action wherein the performance of the action is not based on the at least one of the telephone number, the customer ID, and the historical transaction information specific to the customer;
if another action must be performed in response to the caller's selection of the option, then:
(a) determining whether the another action is related to at least one of the telephone number, the customer ID, and the historical transaction information specific to the customer;
(b) if the another action is related to the at least one of the telephone number, the customer ID, and the historical transaction information specific to the customer, then performing the another action wherein the performance of the another action is based on the at least one of the telephone number, the customer ID, and the historical transaction information specific to the customer;
(c) if the another action is not related to the at least one of the telephone number, the customer ID, and the historical transaction information specific to the customer, then performing the another action wherein the performance of the another action is not based on the at least one of the telephone number, the customer ID, and the historical transaction information specific to the customer;
and
(d) repeating (a) through (c) until all actions that must be performed in response to the caller's selection of the option have been performed.

7. The system of claim 6 wherein the historical transaction information specific to the customer comprises an existing airline flight reservation; and
wherein the plurality of options comprises at least one of the following:
an option for reviewing the existing airline flight reservation;
an option for modifying the existing airline flight reservation; and
an option for canceling the existing airline flight reservation.

8. The system of claim 5 wherein the call is transferred to the main menu if neither the telephone number from which the caller initiated the call, nor the customer ID specific to the caller, has been retrieved; and
wherein the main menu comprises one or more of the following:
an option for transferring to an airline flight reservations application;
an option for transferring to an airline travel plans application;
an option for transferring to an airline flight information application; and
an option for transferring to a sub-menu application.

9. A system for processing a caller-initiated call, the system comprising:
a call processing system adapted to receive the caller-initiated call, the call processing system comprising a node and a network configured to allow communication between the node and an access device by which the caller initiates the call, the node comprising:
at least one microprocessor; and
a computer readable medium comprising a plurality of instructions stored therein, the plurality of instructions being automatically executed by the at least one microprocessor in response to the receiving of the caller-initiated call by the call processing system, the plurality of instructions comprising:

instructions for determining whether a telephone number from which the caller initiated the call has been retrieved in response to receiving the caller-initiated call;

instructions for if the telephone number from which the caller initiated the call has been received, then determining whether a customer ID specific to the caller has been retrieved in response to receiving the telephone number from which the caller initiated the call;

instructions for if the telephone number from which the caller initiated the call has not been retrieved, then:
  requesting from the caller the customer ID specific to the caller; and
  determining whether the customer ID specific to the caller has been retrieved in response to requesting from the caller the customer ID specific to the caller;

instructions for if the telephone number from which the caller initiated the call, and the customer ID specific to the caller, have been retrieved, then:
  determining whether historical transaction information specific to the caller and based on at least the telephone number and the customer ID has been retrieved;
  if the historical transaction information specific to the caller and based on at least the telephone number and the customer ID has been retrieved, then:
    automatically presenting at least one message to the caller, the at least one message being based on:
      the telephone number from which the caller initiated the call;
      the customer ID specific to the caller; and
      the historical transaction information specific to the caller and based on at least the telephone number and the customer ID;
  and
  if the historical transaction information specific to the caller and based on at least the telephone number and the customer ID has not been retrieved, then:
    automatically presenting at least one message to the caller, the at least one message being based on:
      the telephone number from which the caller initiated the call;
      and
      the customer ID specific to the caller;

instructions for if the telephone number from which the caller initiated the call has been retrieved but the customer ID specific to the caller has not been retrieved, then:
  determining whether historical transaction information specific to the caller and based on at least the telephone number has been retrieved;
  if the historical transaction information specific to the caller and based on at least the telephone number has been retrieved, then:
    automatically presenting at least one message to the caller, the at least one message being based on:
      the telephone number from which the caller initiated the call;
      and
      the historical transaction information specific to the caller and based on at least the telephone number;
    and
    if the historical transaction information specific to the caller and based on at least the telephone number has not been retrieved, then:
      automatically presenting at least one message to the caller, the at least one message being based on:
        the telephone number from which the caller initiated the call;

instructions for if the telephone number from which the caller initiated the call has not been retrieved but the customer ID specific to the caller has been retrieved, then:
    determining whether historical transaction information specific to the caller and based on at least the customer ID has been retrieved;
    if the historical transaction information specific to the caller and based on the customer ID has been retrieved, then:
      automatically presenting at least one message to the caller, the at least one message being based on:
        the customer ID specific to the caller; and
        the historical transaction information specific to the caller and based on at least the customer ID;
      and
    if the historical transaction information specific to the caller and based on at least the customer ID has not been retrieved, then:
      automatically presenting at least one message to the caller, the at least one message being based on:
        the customer ID specific to the caller;
    and
  instructions for if neither the telephone number from which the caller initiated the call nor the customer ID specific to the caller has been retrieved, then:
    transferring the call to an agent or a main menu.

10. The system of claim 9 wherein the at least one message comprises a plurality of options, each of which is selectable by the caller; and
  wherein the plurality of instructions further comprises:
  instructions for determining whether the caller has selected an option in the plurality of options;
  and
  instructions for if the caller has selected the option, then:
    determining an action in response to the caller's selection of the option;
    determining whether the action is related to at least one of the telephone number, the customer ID, and the historical transaction information specific to the customer;
    if the action is related to the at least one of the telephone number, the customer ID, and the historical transaction information specific to the customer, then performing the action wherein the performance of the action is based on the at least one of the telephone number, the customer ID, and the historical transaction information specific to the customer;

if the action is not related to the at least one of the telephone number, the customer ID, and the historical transaction information specific to the customer, then performing the action wherein the performance of the action is not based on the at least one of the telephone number, the customer ID, and the historical transaction information specific to the customer;

if another action must be performed in response to the caller's selection of the option, then:
  (a) determining whether the another action is related to at least one of the telephone number, the customer ID, and the historical transaction information specific to the customer;
  (b) if the another action is related to the at least one of the telephone number, the customer ID, and the historical transaction information specific to the customer, then performing the another action wherein the performance of the another action is based on the at least one of the telephone number, the customer ID, and the historical transaction information specific to the customer;
  (c) if the another action is not related to the at least one of the telephone number, the customer ID, and the historical transaction information specific to the customer, then performing the another action wherein the performance of the another action is not based on the at least one of the telephone number, the customer ID, and the historical transaction information specific to the customer; and
  (d) repeating (a) through (c) until all actions that must be performed in response to the caller's selection of the option have been performed.

11. The system of claim 10 wherein the historical transaction information specific to the customer comprises an existing airline flight reservation; and
  wherein the plurality of options comprises at least one of the following:
    an option for reviewing the existing airline flight reservation;
    an option for modifying the existing airline flight reservation; and
    an option for canceling the existing airline flight reservation.

12. The system of claim 9 wherein the call is transferred to the main menu if neither the telephone number from which the caller initiated the call, nor the customer ID specific to the caller, has been retrieved; and
  wherein the main menu comprises one or more of the following:
    an option for transferring to an airline flight reservations application;
    an option for transferring to an airline travel plans application;
    an option for transferring to an airline flight information application; and
    an option for transferring to a sub-menu application.

13. The system of claim 9 further comprising:
  the access device by which the caller initiates the call.

* * * * *